Oct. 30, 1956 J. BACK 2,768,402
GLASS CLEANING DEVICE
Filed Feb. 13, 1953 2 Sheets-Sheet 1
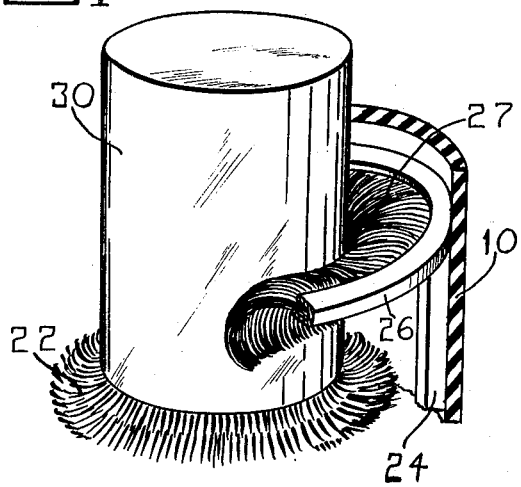
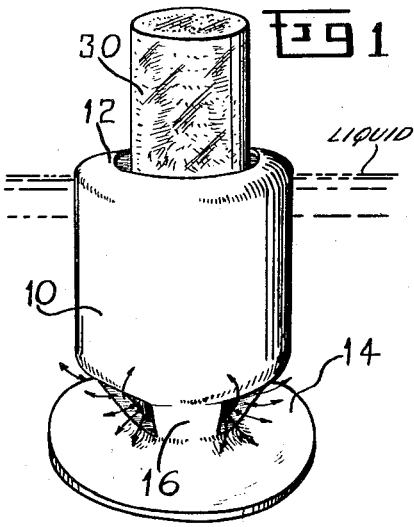
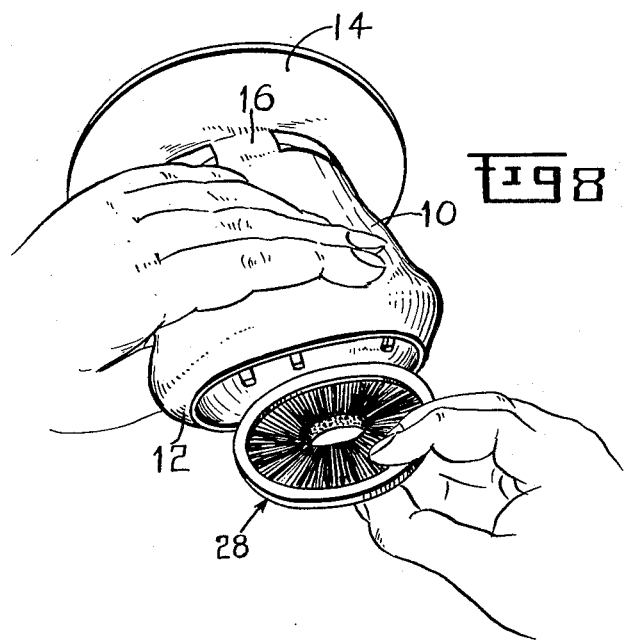
INVENTOR.
JAMES BACK
BY
HIS ATTORNEY Oct. 30, 1956   J. BACK   2,768,402
GLASS CLEANING DEVICE
Filed Feb. 13, 1953   2 Sheets-Sheet 2
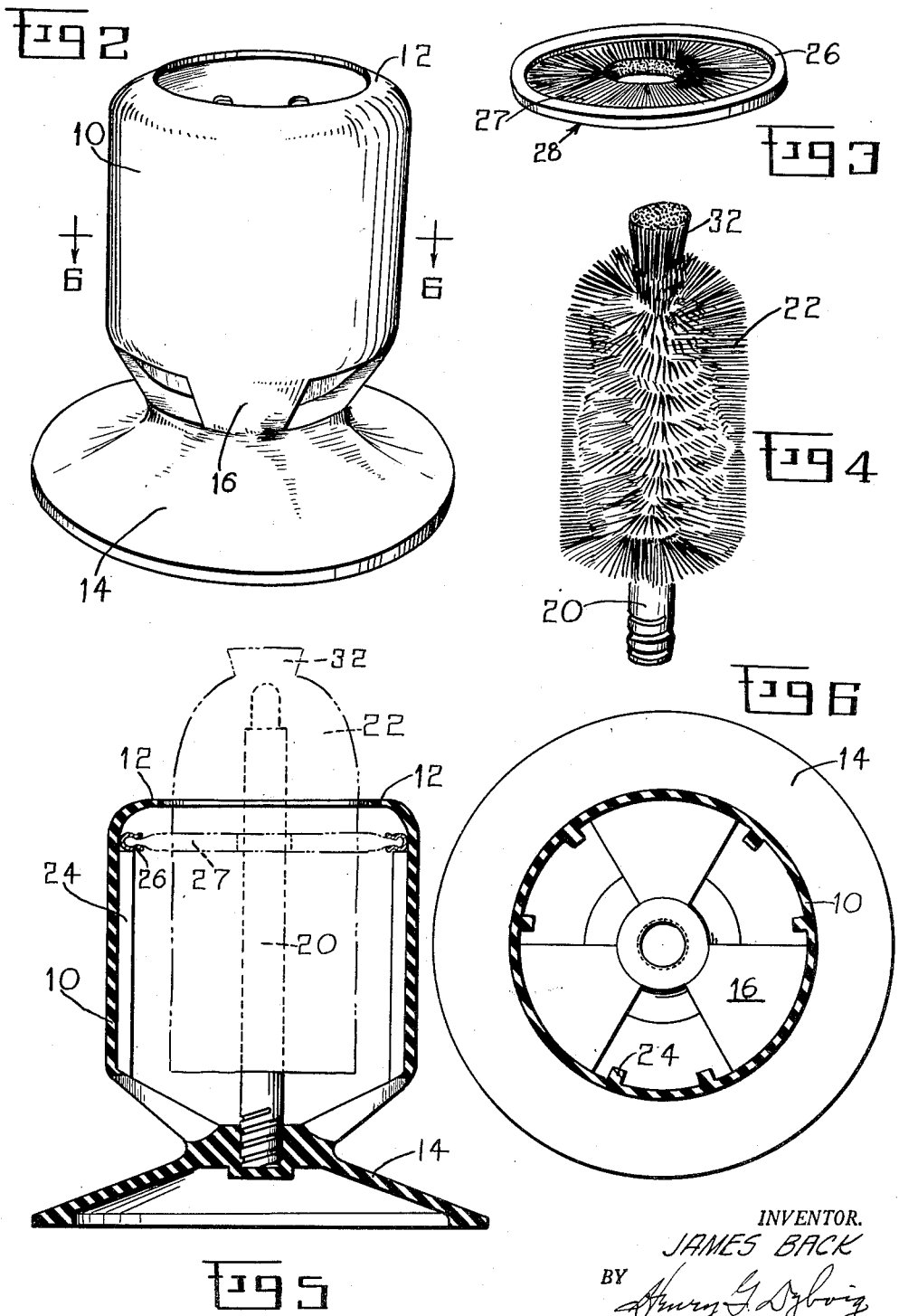
INVENTOR.
JAMES BACK
BY
HIS ATTORNEY

United States Patent Office 2,768,402
Patented Oct. 30, 1956

2,768,402

GLASS CLEANING DEVICE

James Back, Dayton, Ohio, assignor of one-third to William F. Vocke and one-third to Bernard J. Vocke, Dayton, Ohio Application February 13, 1953, Serial No. 336,724

1 Claim. (Cl. 15—164)

This invention relates to a glass cleaning device. It particularly relates to a washing device for glasses employed to dispense beverages in public places. It is not necessarily so limited, in that this invention may be used for cleaning drink containers which are not made out of glass and which are used in private homes as well as in many other locations.

It is an object of this invention to provide a glass cleaning device which thoroughly cleans the drinking utensil, both on the inside and on the outside.

It is another object of this invention to provide a glass cleaning device which can be easily disassembled so that the brushes can be readily and easily cleaned frequently.

It is another object of this invention to provide a glass or tumbler washer which may be retained in a desired position on the bottom of a liquid container such as a sink, a tub or a pan.

Still a further object of this invention is to provide a glass washing device which has brushes which are easily replaceable and interchangeable so that the brushes may be easily interchanged as they become worn or in other manner unusable.

Other objects and advantages reside in the construction of parts, the combination thereof and the mode of operation, as will become more apparent from the following description.

In the drawings:

Figure 1 is a perspective view of the glass cleaning device showing a glass in position to be cleaned.

Figure 2 is a perspective view of the glass cleaning device with the brushes removed.

Figure 3 is a perspective view of the ring brush element of the glass cleaning device.

Figure 4 is a perspective view of the cylindrical brush element of the glass cleaning device.

Figure 5 is a side sectional view of the housing of the glass cleaning device disclosing the respective positions of the brush elements in the housing.

Figure 6 is a sectional view taken substantially on line 6—6 of Figure 2.

Figure 7 is a fragmentary perspective view of the glass cleaning device showing a glass in the position in which it is located with respect to the brushes during the cleaning process.

Figure 8 is a perspective view disclosing the manner in which the ring brush element is inserted or removed from the housing member of the glass cleaning device.

Reference numeral 10 refers to the cylindrical housing member of the glass cleaning device having an inwardly directed flange 12 at the top portion thereof. A base member 14, cup-like in shape, serves as a suction cup to retain the glass cleaning device in a desired position on the bottom or side wall of a fluid container such as a sink, tub, pan or other type of fluid container. The cylindrical body member 10 is retained in spaced relation from the base member 14 by means of a plurality of legs 16 which diverge upwardly and outwardly from the base member 14 in a spider like formation. The entire body portion 10 and the base portion 14, with the legs 16, are made as one complete integral unit by a molding process. The preferable material used is rubber; however, pliable plastic materials or synthetic rubber material may also be used. The central portion of the upper part of the base 14 is provided with a threaded hole which is adapted to receive complementary threads on the lower part of a stem 20 of a substantially cylindrical brush 22. The brush 22 extends upwardly, as clearly shown in Figure 5. Within the body portion 10 is a series of vertical ribs 24 which extend substantially the length of the cylindrical body portion 10. The rib members 24 act as body supports within the body portion 10 and also act as supports for a rim 26 of a ring type of brush 28 having radiating bristles 27, which rests on the upper edges of the ribs 24. The ring brush element 28 is held in position by means of the flange portion 12, which extends inwardly over the rim 26 and retains the rim 26 of the ring brush element 28 firmly upon the upper ends of the ribs 24. The width of the rim 26 is small compared to the length of the bristles 27. Due to the fact that the entire glass cleaning unit is made of pliable material, the ring brush element is easily inserted or removed from the body portion 10 as clearly shown in Figure 8. As disclosed in Figure 8, the body portion 10 may be squeezed and the shape of the flange opening distorted with one hand while the other hand is used to carry the ring brush element inwardly or outwardly through the flange opening. It may be readily understood that it is a simple matter to remove or insert either of the brush elements 28 or 22. When a glass cleaning device is used in public places it is particularly advantageous to be able to easily and readily remove the cleaning elements, which in this invention are the brush elements 22 and 28, from the main structure of the cleaning device. It is very important that the proper sanitary precautions be observed in public places. Therefore, it is ordinarily necessary to remove and to clean the brush elements frequently. Due to the fact that this removal and insertion process is so extremely simple in this invention, the device is particularly to be desired by those who operate public beverage drinking establishments. Furthermore, it is possible to employ the use of brush cleaning elements which are made in various sizes so that beverage drinking utensils of any given size in any particular application or location may be effectively cleaned with the use of brush elements which are precisely adapted for the cleaning of glasses of any given size.

The glass cleaning device may be retained at the bottom of a liquid container by means of the suction cup type of base 14. The liquid surrounds the glass cleaning device substantially as shown in Figure 1.

A beverage drinking container, shaped substantially as the glass 30 shown in the drawings, can be thoroughly cleaned in a few moments by placing the glass with the open end downwardly through the opening formed by the flange 12 at the top of the cylindrical housing 10 over the cylindrical brush element 22. The outer surface of the cylindrical glass 30 is then firmly engaged by the radial bristles of the ring brush element 28. The cleaning process may then be accomplished by a few vertical reciprocating motions of the glass 30 with respect to the brushes 28 and 22. The cylindrical brush element 22 has outwardly extending bristles and also has a group of upwardly extending bristles 32 near the top thereof so that all of the inside of the glass 30 is thoroughly cleaned by the cylindrical brush element 22. The radially converging bristles of the ring brush element 28 thoroughly clean the outer portion of the glass 30 while the inner portion of the glass 30 is being cleaned by the cylindrical brush member 22. As the glass is reciprocated vertically with respect to the brushes 22 and 28, the glass may also be rotated slightly. During the reciprocating motion the cleaning fluid is forced inwardly and outwardly through the openings formed among the legs 16 between the base portion 14 and the cylindrical body portion 10, as shown in Figure 1. This agitation of the cleaning liquid provides a very effective cleaning action in cooperation with the reciprocating action of the glass with respect to the brush elements.

Due to the fact that the glass cleaning unit comprises rubber, synthetic rubber or pliable plastic materials, the glass cleaning unit can be used in liquid solutions containing harsh chemical cleaning compounds.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claim.

Having thus described my invention, I claim:

A washing device for drinking glasses and the like comprising a hollow cylindrical body member of pliable material, having an inwardly extending flange at one end thereof, and having a plurality of internal parallel longitudinal ribs, one end of the ribs being adjacent the flange, a base member of pliable material consisting of a suction cup, a plurality of legs of pliable material attached to the base member and to the body member at the end thereof opposite the flange and retaining the body member in spaced relationship from the base member, the base member being substantialy concentric with the body member, said body member, flange, ribs, base member and legs being integrally molded as a single piece, the base member having a threaded orifice at the central portion thereof, a stem member having threads adjacent one end thereof, a substantially cylindrical brush member attached to the stem member concentric therewith, the threaded end of the stem member being threadedly attached to the base member by means of the threaded orifice in the base member, a substantially flat ring, the ring having a plurality of inwardly projecting radial bristles, the ring being mounted upon said end of the internal longitudinal ribs and supported thereby, the ring being retained in position intermediate the inwardly projecting flange member and said end of the internal vertical ribs.

References Cited in the file of this patent
UNITED STATES PATENTS

| | | |
|---|---|---|
| 579,600 | Nesbit | Mar. 30, 1897 |
| 1,921,509 | De Forest | Aug. 8, 1933 |
| 2,128,011 | Morgan | Aug. 23, 1938 |

FOREIGN PATENTS

| | | |
|---|---|---|
| 164,157 | Switzerland | of 1933 |
| 848,346 | Germany | of 1952 |